United States Patent
Lana et al.

(10) Patent No.: US 9,845,754 B2
(45) Date of Patent: Dec. 19, 2017

(54) CONTROL OF INTERNAL COMBUSTION ENGINES IN RESPONSE TO EXHAUST GAS RECIRCULATION SYSTEM CONDITIONS

(71) Applicant: Cummins Inc., Columbus, IN (US)

(72) Inventors: Carlos Alcides Lana, Columbus, IN (US); David J. Stroh, Columbus, IN (US); Samuel C. Geckler, Columbus, IN (US); Marten H. Dane, Columbus, IN (US); Anthony Kyle Perfetto, Columbus, IN (US); Karthik Kappaganthu, Bloomington, IN (US); Govindarajan Kothandaraman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 180 days.

(21) Appl. No.: 14/578,912

(22) Filed: Dec. 22, 2014

(65) Prior Publication Data

US 2015/0176513 A1 Jun. 25, 2015

Related U.S. Application Data

(60) Provisional application No. 61/919,979, filed on Dec. 23, 2013.

(51) Int. Cl.
*F02M 25/07* (2006.01)
*F02D 41/14* (2006.01)
(Continued)

(52) U.S. Cl.
CPC ....... *F02D 41/1439* (2013.01); *F02D 35/021* (2013.01); *F02D 37/02* (2013.01); *F02D 41/008* (2013.01); *F02D 41/0052* (2013.01); *F02D 41/0065* (2013.01); *F02D 41/1448* (2013.01); *F02D 41/1451* (2013.01); *F02D 41/1452* (2013.01); *F02D 41/1454* (2013.01); *F02M 26/05* (2016.02); *F02M 26/43* (2016.02);
(Continued)

(58) Field of Classification Search
CPC ........................................ F02M 26/43
USPC ........................................ 123/58.8
See application file for complete search history.

(56) References Cited

U.S. PATENT DOCUMENTS 4,131,095 A * 12/1978 Ouchi ............ F02B 1/06
123/3
4,143,635 A    3/1979 Iizuka et al.
(Continued)

FOREIGN PATENT DOCUMENTS

WO    2007027327 A2    3/2007
WO    2010116064 A1    10/2010
(Continued)

OTHER PUBLICATIONS

PCT/US2013/048786 International Search Report and Written Opinion, dated Dec. 13, 2013, 12 pages.

*Primary Examiner* — Erick Solis
(74) *Attorney, Agent, or Firm* — Taft Stettinius & Hollister LLP

(57) ABSTRACT

A system includes an internal combustion engine having a number of cylinders, with at least one of the cylinder(s) being a primary EGR cylinder that is dedicated to provided EGR flow during at least some operating conditions. A controller is structured to control combustion conditions in the cylinders in response to one or more operating conditions associated with the engine.

19 Claims, 4 Drawing Sheets

(51) Int. Cl.
*F02P 5/04* (2006.01)
*F02D 41/00* (2006.01)
*F02P 5/15* (2006.01)
*F02D 37/02* (2006.01)
*F02M 26/43* (2016.01)
*F02M 26/05* (2016.01)
*F02D 35/02* (2006.01)
*F02M 26/46* (2016.01)

(52) U.S. Cl.
CPC ............ *F02P 5/045* (2013.01); *F02P 5/1516* (2013.01); *F02D 35/02* (2013.01); *F02D 35/023* (2013.01); *F02D 35/027* (2013.01); *F02D 41/0055* (2013.01); *F02D 2041/147* (2013.01); *F02D 2041/1431* (2013.01); *F02D 2200/1015* (2013.01); *F02D 2250/18* (2013.01); *F02M 26/46* (2016.02); *Y02T 10/46* (2013.01); *Y02T 10/47* (2013.01)

(56) References Cited

U.S. PATENT DOCUMENTS

| | | | |
|---|---|---|---|
| 4,386,597 A | 6/1983 | Ootaka et al. | |
| 4,674,464 A | 6/1987 | Akagi | |
| 5,398,653 A | 3/1995 | Merritt | |
| 5,802,846 A | 9/1998 | Bailey | |
| 6,138,649 A | 10/2000 | Khair et al. | |
| 6,257,176 B1 | 7/2001 | Shimasaki et al. | |
| 6,286,489 B1 | 9/2001 | Bailey | |
| 6,474,060 B2 | 11/2002 | Khair | |
| 6,655,324 B2 | 12/2003 | Cohn et al. | |
| 6,742,507 B2 | 6/2004 | Keefer et al. | |
| 6,877,492 B1 | 4/2005 | Osterwald | |
| 7,028,644 B2 | 4/2006 | Cohn et al. | |
| 7,036,465 B2 | 5/2006 | Burk et al. | |
| 7,389,771 B2 | 6/2008 | Andrews et al. | |
| 7,444,815 B2 | 11/2008 | Baumgard et al. | |
| 7,487,766 B2 | 2/2009 | Alger et al. | |
| 7,721,541 B2 | 5/2010 | Roberts, Jr. et al. | |
| 8,020,539 B2 | 9/2011 | Maunoury | |
| 8,036,810 B2 | 10/2011 | Schuckert et al. | |
| 8,103,428 B2 | 1/2012 | Russ et al. | |
| 8,146,572 B2 | 4/2012 | Macfarlane | |
| 9,297,320 B2 * | 3/2016 | Hilditch ................ F02M 26/16 | |
| 2004/0045278 A1 * | 3/2004 | Pott ........................ F02D 37/00 | 60/274 |
| 2005/0016496 A1 * | 1/2005 | Hitomi .................... F01L 1/053 | 123/305 |
| 2006/0037578 A1 | 2/2006 | Nakamura | |
| 2008/0264036 A1 * | 10/2008 | Bellovary ................ F01N 3/00 | 60/274 |
| 2009/0063023 A1 | 3/2009 | Nagae | |
| 2009/0199790 A1 | 8/2009 | Cathcart et al. | |
| 2009/0308070 A1 * | 12/2009 | Alger, II ............. F02D 13/0238 | 60/602 |
| 2010/0217503 A1 | 8/2010 | Leone et al. | |
| 2010/0300383 A1 | 12/2010 | Pursifull et al. | |
| 2011/0253113 A1 | 10/2011 | Roth et al. | |
| 2012/0023937 A1 | 2/2012 | Styles et al. | |
| 2012/0048244 A1 | 3/2012 | Hayman et al. | |
| 2012/0060497 A1 | 3/2012 | Roth | |
| 2012/0078492 A1 * | 3/2012 | Freund ................ F02D 41/0065 | 701/108 |
| 2012/0204844 A1 | 8/2012 | Gingrich et al. | |
| 2012/0204845 A1 * | 8/2012 | Gingrich ................ F02M 26/43 | 123/568.17 |
| 2012/0260894 A1 | 10/2012 | Hayman | |
| 2013/0061575 A1 * | 3/2013 | Korenaga ........... F02D 41/0065 | 60/278 |
| 2014/0000248 A1 * | 1/2014 | Mitani ...................... B03C 3/41 | 60/311 |
| 2014/0196697 A1 * | 7/2014 | Burrahm ................ F02M 26/43 | 123/568.11 |
| 2014/0196702 A1 * | 7/2014 | Gingrich ............ F02D 41/0065 | 123/568.21 |
| 2014/0202433 A1 | 7/2014 | Dane et al. | |
| 2014/0261322 A1 | 9/2014 | Geckler et al. | |
| 2014/0360461 A1 * | 12/2014 | Ulrey ..................... F02M 26/43 | 123/299 |
| 2015/0198099 A1 * | 7/2015 | Ulrey .................. F02D 13/0242 | 60/602 |
| 2015/0260128 A1 * | 9/2015 | Roth ..................... F01L 1/3442 | 123/568.13 |
| 2016/0131056 A1 * | 5/2016 | Henry ................ F02D 41/0082 | 60/274 |
| 2016/0245239 A1 * | 8/2016 | Henry .................... F02M 26/35 | |

FOREIGN PATENT DOCUMENTS

| | | |
|---|---|---|
| WO | 2011025586 A1 | 3/2011 |
| WO | 2012039732 A1 | 3/2012 |

\* cited by examiner

CONTROL OF INTERNAL COMBUSTION ENGINES IN RESPONSE TO EXHAUST GAS RECIRCULATION SYSTEM CONDITIONS

CROSS-REFERENCE TO RELATED APPLICATION

The present application claims the benefit of the filing date of U.S. Provisional Application Ser. No. 61/919,979 filed on Dec. 23, 2013, which is incorporated herein by reference in its entirety.

BACKGROUND

Spark-ignition engines typically operate by introducing a stoichiometric mixture of air and fuel into a cylinder of an engine. A piston then compresses this mixture, and at a predetermined crankshaft angle, a spark plug will ignite the air/fuel mixture producing a flame front that propagates through the combustion chamber. The rapid increase in heat from the burned fuel triggers an increase in pressure which forces the piston downward in the cylinder. The ability to precisely time the combustion event through the use of a spark plug is a benefit of the spark-ignition engine. However, the spark-ignition engine may be somewhat inefficient since the compression ratio of the engine is kept to a relatively low level to avoid "knock." Knock occurs when the air/fuel mixture ignites independently of the spark plug and may cause engine damage.

Another condition affecting engine operation involves misfire occurrences. For engines operating with one or more cylinders that are EGR cylinders, a misfire in the EGR cylinder(s) impacts the performance of the other cylinders due to the recirculation of the output from the EGR cylinder. For example, in a misfire condition an additional amount of hydrocarbons from the EGR cylinders is passed back to the intake of the other cylinders. This additional fuelling in combination with the misfire condition can result in catalyst damage and increased emissions.

Engines with one or more cylinders that provide primary or dedicated EGR flow can enjoy greatly simplified controls and pressure management, fewer hardware devices, and other benefits. However, these simplifications come at the cost of a loss of control over the system, including a loss of control due to the different conditions that may be present in the EGR cylinder(s) compared to the other cylinders, such as characteristics of the charge flow, fuel, exhaust, and combustion associated with the EGR cylinder(s). An engine having primary EGR cylinder(s) provides an opportunity for greater control over the temperature and composition of the charge flow to the intake manifold, if a system could be developed to take advantage of this opportunity. Therefore, further technological developments are desirable in this area.

SUMMARY

One embodiment is a unique system for controlling a divided exhaust engine with at least one primary EGR cylinder and a plurality of non-primary EGR cylinders. Other embodiments include unique methods, systems, and apparatus to control divided exhaust engines with at least one primary EGR cylinder and a plurality of non-primary EGR cylinders.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
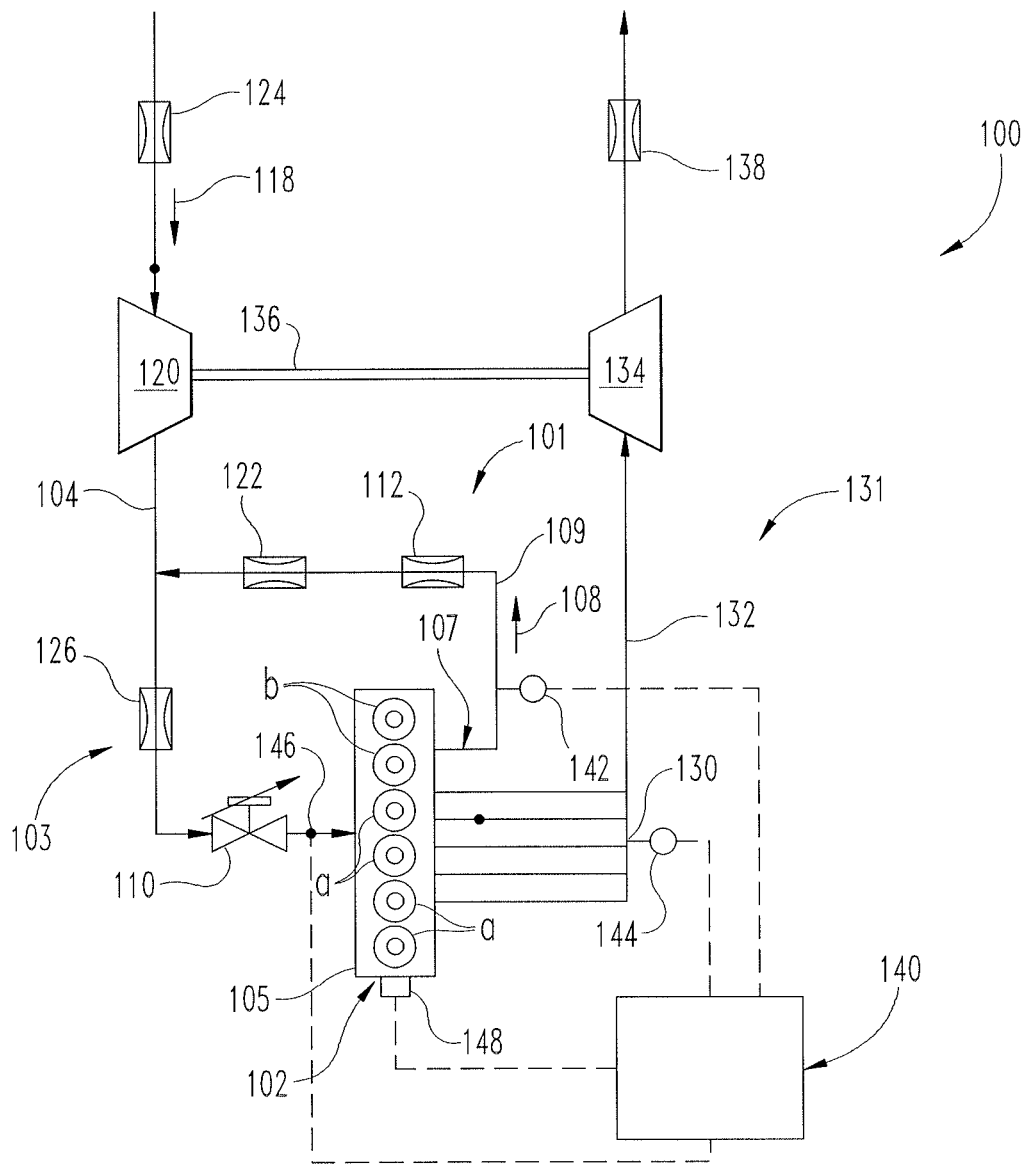
FIG. 1 is a schematic depiction of one embodiment of a system having an engine with a divided exhaust system to provide EGR flow from at least one primary EGR cylinder.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 is depicted having an engine 102 and an EGR system 101. The engine 102 is an internal combustion engine of any type, and can include a stoichiometric engine, a gasoline engine, and/or a natural gas engine. In certain embodiments, the engine 102 includes a lean combustion engine such as a lean burn gasoline engine or a diesel cycle engine. In certain embodiments, the engine 102 may be any engine type producing emissions that may include an exhaust gas recirculation (EGR) system, for example to reduce $NO_x$ emissions from the engine 102. The engine 102 includes a number of cylinders a, b. The number of cylinders may be any number suitable for an engine, and the arrangement may be any suitable arrangement, such as an in-line or V-shaped arrangement. The system 100 includes an in-line six cylinder arrangement for illustration purposes only. The example engine 102 may further include an ignition source such as a spark plug (not shown) in certain embodiments.

In certain embodiments, the engine 102 is provided as a spark-ignition internal combustion engine, configured to develop mechanical power from internal combustion of a stoichiometric mixture of fuel and induction gas. As used herein, the phrase "induction gas" includes a charge flow, and may include fresh air, recirculated exhaust gases, or the like, or any combination thereof. The intake 103 includes an intake manifold 105 that receives charge flow from an intake passage 104 and distributes the induction gas to combustion chambers of cylinders a, b of the engine 102. Accordingly, an inlet of the intake manifold 105 is disposed downstream of an outlet of the intake passage 104, and an outlet of the intake manifold 105 is disposed upstream of an inlet of each of the combustion chambers in engine 102. A first exhaust manifold 107 collects exhaust gases from combustion chambers of primary EGR cylinder(s) b of the engine 102 and conveys the exhaust gases to EGR passage 109 of EGR system 101, and a second exhaust manifold 130 collects exhaust gases from combustion chambers of non-primary EGR cylinders a of the engine 102 and conveys the exhaust gases to the exhaust passage 132. Accordingly, inlets of the exhaust manifolds 107, 130 are disposed downstream of an outlet of each of the combustion chambers of the respective cylinder b, a in engine 102, and upstream of inlets to the respective EGR passage 109 and exhaust passage 132.

Figure 6:
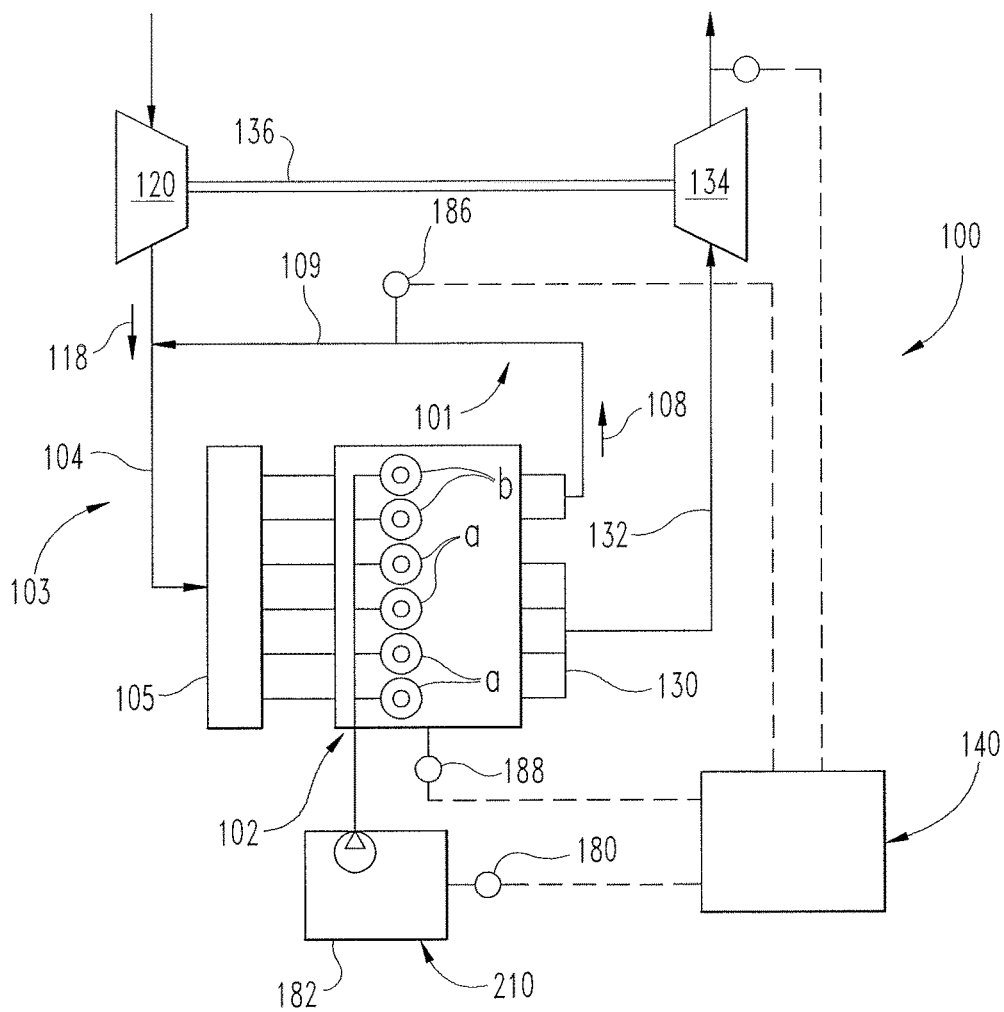
FIG. 6 is a schematic depiction of another embodiment system having at least one primary EGR cylinder.

Although not shown in FIG. 1, injectors may also be arranged within the engine 102 to deliver fuel directly or indirectly into the combustion chamber of cylinders a, b from a fuel system, such as fuel system 210 in FIG. 6. The fuel system 210 is structured to deliver fuel to the engine 102 in response to a fuelling command that provides one or more of a fuel amount, timing, pressure and duration of fuel injection to each of the cylinders a, b. The fuel system 210 includes a fuel tank 182. In one embodiment, the fuel system 210 can be configured to deliver gasoline to the engine 102 from fuel tank 182. In another embodiment, the fuel system 210 can be configured to deliver another type of fuel, in addition to gasoline, to the engine 102. Examples of such additional fuels include diesel (or other high cetane fuels), natural gas, ethanol, and the like. In one embodiment, the fuel system 210 may include one or more injectors configured to inject fuel into the engine 102 so that it may be combusted within a combustion chamber. Example injectors include direct injectors and port injectors.

In the illustrated embodiments, engine 102 includes primary EGR cylinder(s) b, and other or remaining cylinders that are non-primary EGR cylinder(s) a. Non-primary EGR cylinders a can be completely flow isolated from the EGR system, or alternatively connected to provide at least some exhaust flow to the EGR system and/or to receive at least some exhaust flow from the EGR system under certain operating conditions. The term primary EGR, as utilized herein, should be read broadly. Any EGR arrangement wherein, during at least certain operating conditions, the entire exhaust output of certain cylinders is recirculated to the engine intake is a primary EGR cylinder. A primary EGR cylinder typically, at least during primary EGR operation, includes exhaust divided from one or more of the remaining cylinders that are non-primary EGR cylinders.

In the EGR system 101 of FIG. 1, the EGR flow 108 recirculates in EGR passage 109 and combines with intake flow 118 at a position upstream of intake manifold 105. Intake manifold 105 provides a charge flow including the intake flow 118 combined with EGR flow 108. Intake manifold 105 is connected to intake passage 104 that includes an intake throttle 110 to regulate the charge flow to cylinders a, b. Intake passage 104 may also include a charge air cooler 126 to cool the charge flow provided to intake manifold 105. Intake passage 104 also includes a compressor 120 to compress the intake air flow received from an intake air cleaner 124.

The EGR flow 108 may combine with the intake flow 118 at an outlet of a restriction 122 in EGR passage 109. Restriction 122 may be, for example, a mixer, an accumulator, or any other arrangement. In certain embodiments, the EGR flow 108 returns to the intake manifold 105 directly. The EGR system 101 may be a low-pressure loop, for example returning to the intake at a position upstream of compressor 120, or a high-pressure loop, for example returning to the intake at a position downstream of compressor 120 and/or at the intake manifold 105. The example EGR system 101 includes an EGR cooler 112 in the EGR passage 109. In other embodiments, EGR passage 109 can include a bypass with a valve that selectively allows EGR flow to bypass the EGR cooler 112. The presence of an EGR cooler 112 and/or an EGR cooler bypass is optional and non-limiting. In certain embodiments, the system 100 does not include a compressor or any other type of boost pressure generating device in the intake 101.

Non-primary EGR cylinders a are connected to an exhaust system 131 that includes exhaust manifold 130 that receives exhaust gases from non-primary EGR cylinders a, exhaust passage 132 that receives exhaust gas from exhaust manifold 130, and a turbine 134 in exhaust passage 132 that is operable via the exhaust gases to drive compressor 120 via a rod, shaft 136 or the like. Turbine 134 can be a fixed geometry turbine, a variable geometry turbine with an adjustable inlet, or include a wastegate to bypass exhaust flow. It will be appreciated, however, that the turbocharger may be provided in any other suitable manner (e.g., as a multi-stage turbocharger, or the like), and may be provided with or without a wastegate and/or bypass. Other embodiments contemplate an exhaust throttle (not shown) in the exhaust system 131.

The exhaust system 131 can further include an aftertreatment system 138 in exhaust passage 132 that is configured to treat emissions in the exhaust gas. Aftertreatment system 138 can include any aftertreatment components known in the art. Example aftertreatment components treat carbon monoxide (CO), unburned hydrocarbons (HC), nitrogen oxides ($NO_x$), volatile organic compounds (VOC), and/or particulate matter (PM). Aftertreatment system 138 can include a catalyst such as a three-way catalyst, a particulate filter, or any suitable emissions reduction or treating component.

In certain embodiments, the system 100 includes a controller 140 structured to perform certain operations to control a divided exhaust engine, such as engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or by instructions encoded on computer readable medium. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements. In the illustrated embodiment, controller 140 is connected to EGR sensor(s) 142, exhaust sensor(s) 144, intake sensor(s) 146, and engine sensor(s) 148, as discussed further below.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system performance, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Example parameters related to the operation of the engine 102 determined by sensors 142, 144, 146, 148, which can be real or virtual, include any engine operating parameters that affect or can be correlated to the combustion conditions of cylinders a, b, such as the fresh air (intake) mass flow, charge mass flow, and/or EGR mass flow. In some embodiments, one or more of sensors 142, 144, 146, 148 are oxygen sensors such as universal exhaust gas oxygen (UEGO) or heated exhaust gas oxygen (HEGO) sensors. Further example and non-limiting parameters related to the operation of the engine 102 include an induction gas temperature at the intake passage 104, an induction gas temperature at the intake manifold 105, an induction gas pressure at the intake manifold 105, an exhaust gas temperature at the exhaust manifold 130, an exhaust gas pressure at the exhaust manifold 130, an exhaust gas temperature at the inlet and/or outlet of the exhaust passage 132, an exhaust gas pressure at the inlet and/or outlet of the exhaust passage 132, an exhaust gas temperature at the inlet and/or outlet of the EGR passage 109, an exhaust gas pressure at the inlet and/or outlet of the EGR passage 109, a lift, duration and/or timing of an intake valve and/or an exhaust valve of cylinders a, b, a rate of fuel injection, a type of fuel injected, a speed of compressor 120, a geometry or position of the turbine 134, a composition of induction gas and/or EGR gas, an engine speed value, an engine load, engine torque, engine power output value, an engine knock value, and/or combinations thereof. Additionally or alternatively, an example parameter includes a rate of change or other transformation of any described parameter. The listed parameters are exemplary and non-limiting.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

In certain embodiments, the controller 140 provides a control command, and one or more components of the system 100 are responsive to the control command. The control command, in certain embodiments, includes one or more messages, and/or includes one or more parameters structured to provide instructions to the various engine components responsive to the control command. An engine component responding to the control command may follow the command, receive the command as a competing instruction with other command inputs, utilize the command as a target value or a limit value, and/or progress in a controlled manner toward a response consistent with the engine control command.

Figure 2:
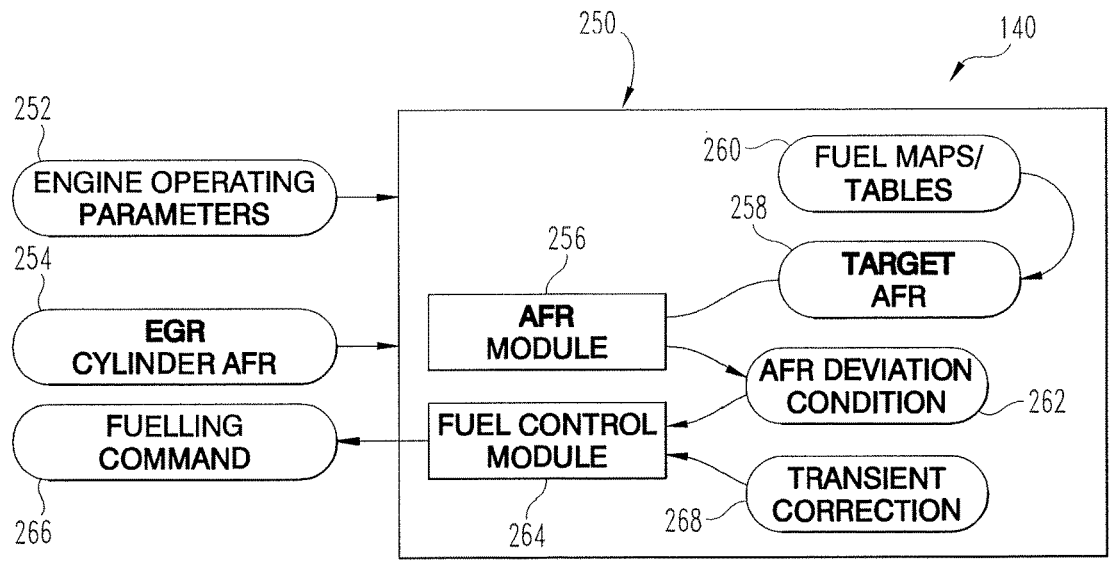
FIG. 2 is a schematic depiction of one embodiment of a control apparatus of the system of FIG. 1.

Certain systems are described following, and include examples of controller operations in various contexts of the present disclosure. In one embodiment shown in FIG. 2, the controller 140 includes a controller apparatus 250 that receive a first input of one or more of the engine operating parameters 252, such as those discussed above, and, in certain embodiments, one or more inputs associated with the EGR cylinder air-fuel ratio (AFR) 254 of primary EGR cylinder(s) b. Controller apparatus 250 includes an AFR module 256 structured to interpret the EGR cylinder AFR input 254 from sensor 142, such as an oxygen ($O_2$)sensor, or to interpret or estimate the AFR input 254 for primary EGR cylinder(s) b from one or more of the engine operating parameters 252. AFR module 256 further is structured to interpret a target AFR 258 for the primary EGR cylinder(s) b from, for example, fuel maps or tables 260 and one or more of the engine operating parameters 252.

AFR module 254 is structured to determine an AFR deviation condition 262 in response to a deviation of the EGR cylinder AFR 254 from target AFR 258. The AFR deviation condition 262 is provided to a fuel control module 264, which outputs commands to change combustion inputs to cylinders a, b, such as a fuelling command 266, in response to the AFR deviation condition 262. In other embodiments, controller apparatus 250 interprets an AFR from the exhaust produced by primary EGR cylinder(s) b, and in response to a AFR deviation condition 262 from a target AFR 258 of primary EGR cylinder(s) b, determines a feedforward fuelling command to cylinders a, b. The fuelling command 266 can provide a first fuelling amount to primary EGR cylinder(s) b and a second fuelling amount to non-primary EGR cylinders a. The first and second fuelling amounts can differ so that the AFR from primary EGR cylinder(s) b is adjusted toward the target AFR while the AFR from non-primary EGR cylinders a is maintained at or adjusted toward stoichiometric in view of the deviation in the oxygen amount contributed to the charge flow indicated by the AFR deviation condition 262. The EGR cylinder AFR 254 from primary EGR cylinder(s) b can be determined from, for example, an $O_2$ sensor or lambda type sensor 142 in the EGR passage 109, by estimation of the oxygen amount using known oxygen estimation techniques, or any suitable AFR determination device and/or method.

In one application of controller apparatus 250, primary EGR cylinder(s) b can potentially have different flow qualities than the other, non-primary EGR cylinders a. For example, the exhaust manifold pressure of primary EGR cylinder(s) b can be different than the exhaust manifold pressure of non-primary EGR cylinders a. Thus, primary EGR cylinder(s) b may have a different quantity of fresh air and EGR flow than the non-primary EGR cylinders a. As a result, the fuelling amount to primary EGR cylinder(s) b to provide a desired AFR from primary EGR cylinder(s) b may differ than the fuelling amount of non-primary EGR cylinders a, and the variable flow conditions between cylinders a, b can also cause a deviation of the actual AFR from primary EGR cylinder(s) b from a target fuelling condition or target AFR.

Figure 3:
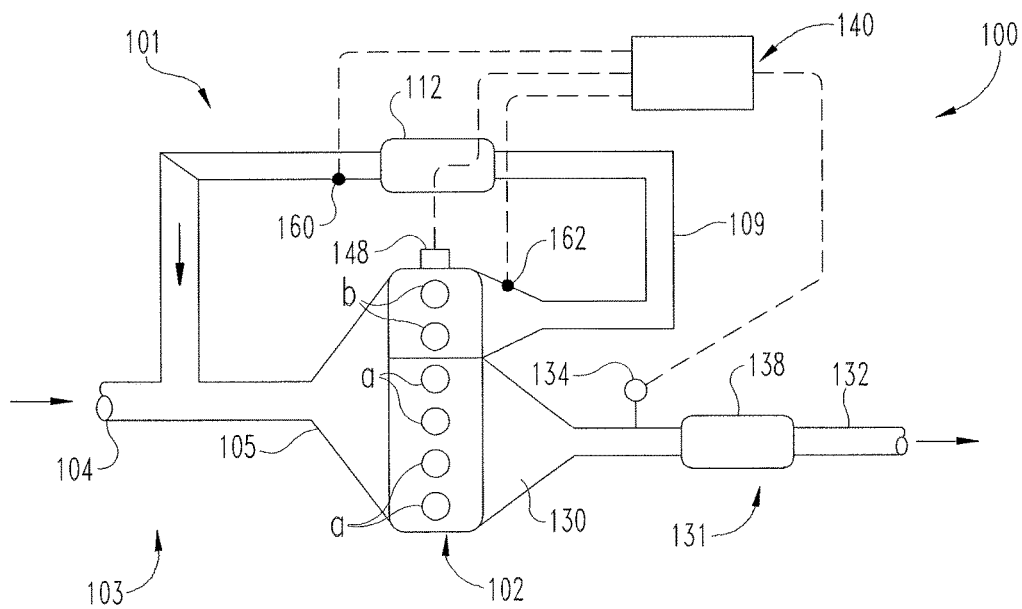
FIG. 3 is a schematic depiction of another embodiment system having at least one primary EGR cylinder.

Referring to FIG. 3, there is shown an embodiment of system 100 in which controller 140 including controller apparatus 250 is connected to an $O_2$ sensor 160 in EGR passage 109 downstream of EGR cooler 112, and to an exhaust manifold pressure (EMP) sensor 162 that is connected to the exhaust manifold 107 of primary EGR cylinder(s) b. Controller apparatus 250 can be structured to determine the charge air mass flow to intake manifold 105 using any suitable sensor, actual or virtual. For example, an output from EMP sensor 162 and/or an output from engine sensors 148, such as a temperature and manifold pressure (TMAP) sensor, engine speed sensor, and variable valve position sensors can be used to estimate the charge flow. The fraction of the charge air mass flow that is EGR mass flow is known, for example, from the ratio of the primary EGR cylinder(s) b to the total number of cylinders a, b. Therefore, the fresh air mass flow can be determined from the difference between the charge air mass flow and the EGR mass flow. Alternatively, a mass air flow sensor can be provided to determine the fresh air mass flow, and EGR mass flow can be determined from the difference between the charge air mass flow and the intake air mass flow.

A fuelling command 266 that provides an amount of fuelling to primary EGR cylinder(s) b to achieve the target AFR 258 can then be determined from the fresh air mass flow. Feedback control of the fuelling amount can be performed by determining the EGR cylinder AFR with $O_2$ sensor 160 and, in response to an AFR deviation condition in the EGR flow, the fuelling amount provided by the fuelling command 266 is modified to provide first and second fuelling amounts to the primary and non-primary EGR cylinders, respectively, to adjust the actual AFR toward the target AFR 258 and maintain stoichiometric conditions in the non-primary EGR cylinders a.

The fuelling command 266 to primary EGR cylinder(s) b can be maintained by feedback control so that a nominal target AFR 258 for primary EGR cylinder(s) b is provided that is slightly rich for generation of $H_2$ and other favorable species in the EGR flow 108 and to reduce the potential for misfires due to lean operation of primary EGR cylinder(s) b. The AFR for non-primary EGR cylinders a can be maintained at or generally at stoichiometric conditions for fuel efficiency and aftertreatment component operation. In one embodiment, $O_2$ sensor 160 in EGR passage 109 can be used to provide feedback control of the fuelling amount to primary EGR cylinder(s) b provided by fuelling command 266 to correct for varying charge flow conditions.

In another embodiment, $O_2$ sensor 160 is eliminated or is a virtual sensor and the EGR cylinder AFR 254 of primary EGR cylinder(s) b is estimated. An $O_2$ sensor 164 in exhaust system 131 is used to determine the AFR of non-primary EGR cylinders a. The output of $O_2$ sensor 164 is used to control the AFR of non-primary EGR cylinders a to the desired engine out AFR. The engine out AFR can be an average AFR for all non-primary EGR cylinders a, or an APR determined on a cylinder-by-cylinder basis. The estimation of the excess or deficit $O_2$ amount produced by primary EGR cylinder(s) b that is recirculated to the intake manifold can also be used for feedforward correction of the fuelling amount provided to the non-primary EGR cylinders a to, for example, maintain stoichiometric conditions.

During transient conditions, the measurement of the exhaust $O_2$ amount in exhaust system 131 during the transient condition is delayed due to the temporary and varying exhaust flow conditions from non-primary EGR cylinders a. However, there is also a delay in the EGR flow 108 from primary EGR cylinder(s) b due to the EGR flow path length from the exhaust valves of the primary EGR cylinder(s) b to the intake manifold 105. In certain embodiments, controller apparatus 250 includes a transient correction 268 in which this time delay is modeled along with the filling dynamics of the exhaust flow paths and the primary EGR cylinder(s) b so that during transient conditions the $O_2$ amount measured in the exhaust flow from non-primary EGR cylinders a can be correlated with the estimate of the excess or deficit $O_2$ amount in EGR flow 108.

In another embodiment, controller 140 is structured to control the combustion inputs to provide fast torque control of engine 102 by adjusting the spark timing of primary EGR cylinder(s) b. Since primary EGR cylinder(s) b are typically run in a rich condition to generate $H_2$, primary EGR cylinder(s) b are cooler than non-primary EGR cylinders a, have more combustion stability, and are more knock tolerant. This knock tolerance and combustion stability provides a wider range of spark operation and opportunities for bi-directional torque control of the primary EGR cylinder(s). For example, primary EGR cylinder(s) b can be operated with advanced spark timing in response to a transient condition as compared to non-primary EGR cylinders a, thus allowing more torque output from primary EGR cylinder(s) b than from non-primary EGR cylinders a to respond to the transient condition, while non-primary EGR cylinders a are continued with operation at the nominal or same spark timing for maximum efficiency.

Figure 4:
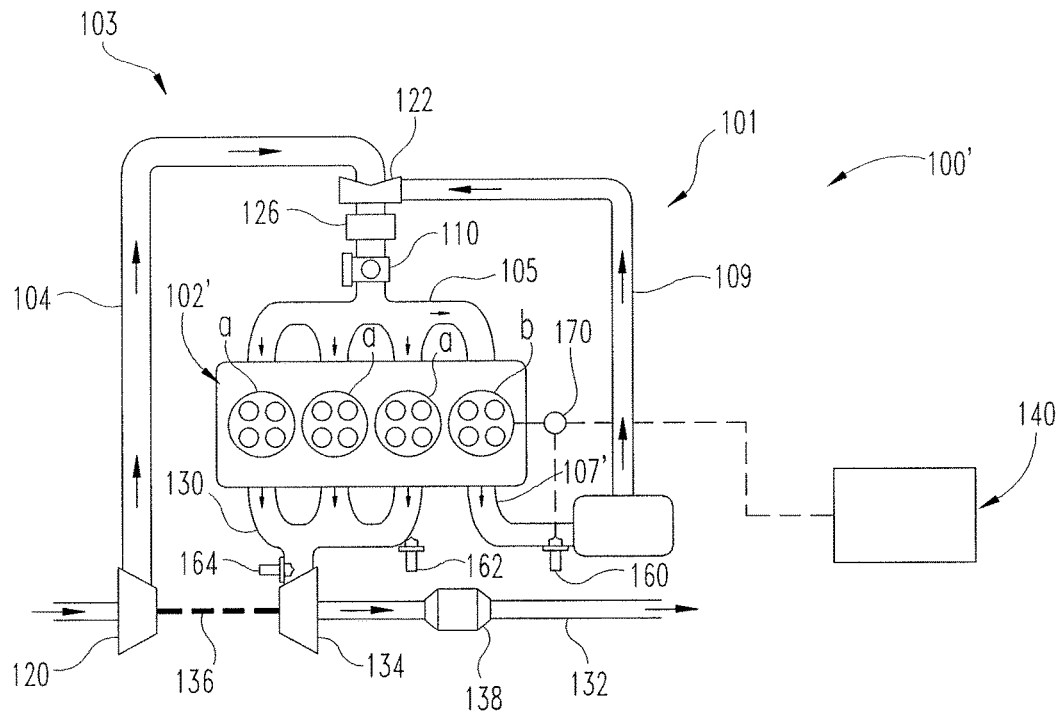
FIG. 4 is a schematic depiction of another embodiment system having at least one primary EGR cylinder.

Referring now to FIG. 4, another embodiment of system 100' includes controller 140 structured for misfire detection in primary EGR cylinder(s) b. System 100' in FIG. 4 is similar to system 100, but is illustrated with a 4 cylinder engine 102', it being understood that system 100' is not limited to such and the principles discussed with reference to system 100' are applicable to system 100. System 100' includes an EGR quality sensor 170 in primary EGR cylinder b. In one embodiment, sensor 170 is an ion sensor. The ion current from ion sensor 170 is used to determine misfire, knock, cylinder pressure, and/or AFR conditions in primary EGR cylinder b. Because primary EGR cylinder b can run at a rich AFR, the reliability of the ion sensor is improved over when used in a cylinder running in a lean condition.

The ion sensor can also be used to estimate the $H_2$ concentration in the exhaust produced by primary EGR cylinder b.

Figure 5:
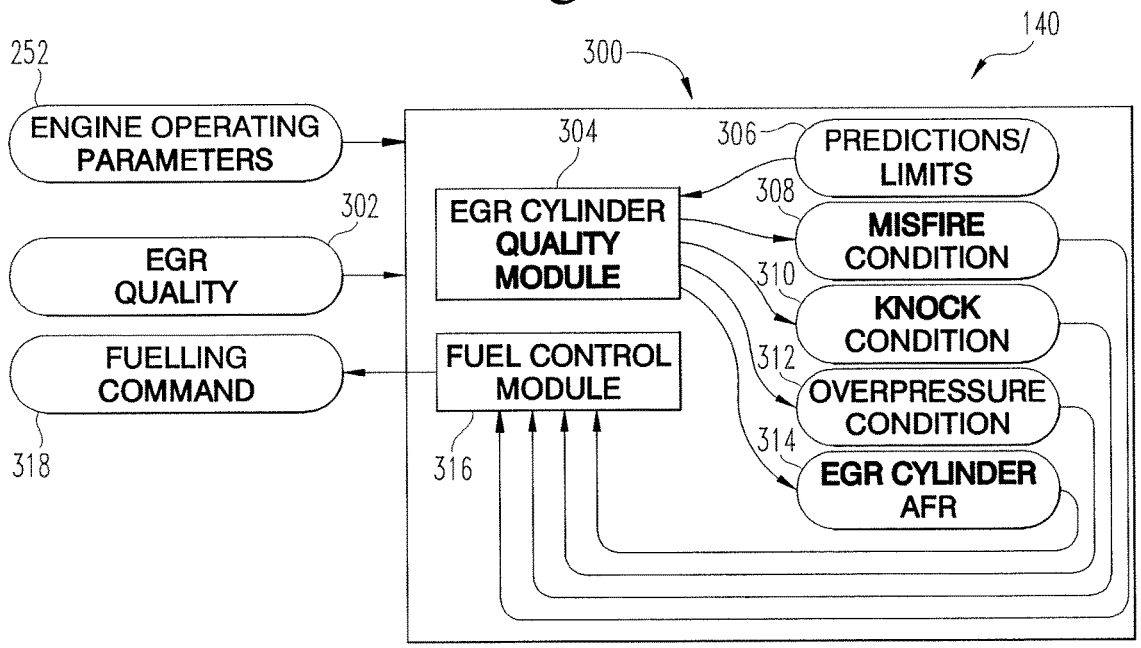
FIG. 5 is a schematic depiction of one embodiment of a control apparatus of the system of FIG. 4.

Referring to FIG. 5, one embodiment controller apparatus 300 of controller 140 is structured to use the estimated EGR quality or qualities from EGR quality sensor 170 for closed loop control in the non-primary EGR cylinders a. Controller apparatus 300 includes an EGR cylinder quality module 304 that receives inputs of engine operating parameters 252 from the various sensors discussed above and an EGR quality input 302 from EGR quality sensor 170. EGR cylinder quality module 304 further interprets protections/limits 306 in response to the engine operating parameters 252 for an incomplete combustion event in primary EGR cylinder(s) b relating to, for example, misfire, knock, and/or cylinder overpressure. EGR cylinder quality module 304 further interprets one or more of a misfire condition 308, a knock condition 310, an overpressure condition 312, and an EGR cylinder AFR 314 in response to EGR quality input 302 and the protections/limits 306.

An indication of one or more of the misfire condition 308, knock condition 310, overpressure condition 312, and EGR cylinder AFR 314 is interpreted by fuel control module 316 to change combustion inputs to non-primary EGR cylinders a with a fuelling command 318 in response thereto. For example, upon detection of a misfire condition 308, the fuelling amount to non-primary EGR cylinders a is compensated to prevent excess emissions and catalyst damage. In an embodiment employing an ion sensor for the EGR quality input 302, the estimated AFR 314 and $H_2$ concentration determined from the ion sensor signal can also be used to control the ignition timing and fuelling in the non-primary EGR cylinders a to improve efficiency, balance and emissions.

In another embodiment, sensor 170 is an optical sensor connected to EGR manifold 107 that provides an EGR quality input 302 that is a fast $CO_2$ measurement using optical signals to detect misfire conditions and the concentration of different species in the exhaust of primary EGR cylinder b. Since the exhaust of only the primary EGR cylinder(s) b is sensed with sensor 170, sensitivity issues associated with optical signals is lessened as compared to optical sensing of exhaust produced by all the cylinders a, b.

In either embodiment of the ion sensor or optical sensor, AFR and ignition control of non-primary EGR cylinders a is provided from ion detection in primary EGR cylinder(s) b. The ion current can also be used to estimate $H_2$ concentration in the EGR flow 108 for use in efficiency improvements. An example procedure and control apparatus includes an operation to interpret a hydrogen amount produced by a primary EGR cylinder b, and to determine a fuel amount for the non-primary EGR cylinders a in response to the hydrogen amount. The procedure further includes an operation to fuel the non-primary EGR cylinders a in response to the determined fuel amount. The fueling of the non-primary EGR cylinders a in response to the determined fuel amount includes, without limitation, fueling the non-primary EGR cylinders a with the fuel amount required to achieve a hydrogen target amount that offsets the detected hydrogen amount to, for example, limit the impact of misfire conditions detected by the EGR quality sensor 170 in response to the hydrogen amount.

Example operations to interpret the hydrogen amount can also include, without limitation, interpreting a CO amount in an exhaust stream of an internal combustion engine including the primary EGR cylinder b, interpreting a fuel composition value for an internal combustion engine including the primary EGR cylinder b, and/or interpreting a fuel quality value for an internal combustion engine including the primary EGR cylinder b. In one example, a calibration of a system can equate field-detectable CO to $H_2$, allowing for a feedback response relating to $H_2$. In another example, a fuel composition value is determined (e.g. entered by an operator, automatically by a fueling system, determined from fuel density or other sensor values, etc.) and the amount of $H_2$ generated is modeled according to predetermined performance values.

Another example system includes an internal combustion engine having a number of cylinders, at least one of the cylinders including a primary EGR cylinder b. The system further includes a controller apparatus 300 that is structured to operate the non-primary dedicated EGR cylinder(s) a at a lean or leaner AFR in response to a misfire condition 308 in the primary EGR cylinder(s) b. The lean AFR may be any value lean of stoichiometric and/or that is less than a fuelling amount provided if misfire conditions were not detected. In certain embodiments, the controller apparatus 300 is structured to modulate the ignition and/or fuelling amount of one or both of primary EGR cylinder(s) b and non-primary EGR cylinders a in response to misfire conditions 308 and the concentration of different species in the exhaust. Additionally or alternatively, the controller apparatus 300 interprets an EGR composition value (e.g. $O_2$ fraction, $H_2$ fraction, CO fraction, unburned hydrocarbon (HC) fraction, etc.) in the EGR flow 108, and modulates combustion inputs such as the AFR and/or ignition timing of non-primary EGR cylinders a in response to the EGR composition value.

An example procedure includes interpreting the hydrogen amount by interpreting a CO amount in an exhaust stream of an internal combustion engine from the primary EGR cylinder b, interpreting a fuel composition value for an internal combustion engine including the primary EGR cylinder b, and/or interpreting a fuel quality value for an internal combustion engine including the primary EGR cylinder b. The procedure further includes determining a fuelling amount to the non-primary EGR cylinders a in response to the hydrogen amount and at least one of the fuel composition value and the fuel quality value.

Referring to FIG. 6, another embodiment of system 100 is disclosed in which the fuelling to primary EGR cylinder(s) b is controlled in response to EGR quality. In engine 102, at least one primary EGR cylinder b is provided that has all of its exhaust routed directly back to the intake passage 104 or intake manifold 105 without any of this exhaust going to exhaust passage 132.

The system 100 further includes fuel system 210 operationally coupled to the engine 102. The fuel system 210 includes any fuel system 210 known in the art operable to deliver a fuel type usable by the engine 102. Example fuel systems 210 include a gasoline system with port fuel injection and/or direct injection, a gasoline and diesel system with the gasoline deliverable by port fuel injection and/or direct injection, a fuel system 210 delivering a stoichiometric fuel with port fuel injection and/or direct injection, and a fuel system 210 delivering a stoichiometric fuel and a compression ignition fuel where the stoichiometric fuel is deliverable by port fuel injection and/or direct injection. As used herein, a stoichiometric fuel is a fuel that is intended during normal operation to be combined with substantially a stoichiometric amount of oxygen, although non-stoichiometric formulations may be utilized in transient or even extended operations. Without limitation, example oxygen amounts on the low end of 80%, 90%, and 95% of stoichiometric, as well as example oxygen amounts of 105%, 110%, and 120% of stoichiometric on the high end, are generally stoichiometric for certain applications.

In the illustrated embodiment of FIG. 6, the primary EGR cylinder b is run rich of stoichiometric AFR to allow for the production of hydrogen and carbon monoxide in the EGR flow 108 that is recirculated to the intake system. The amounts of $H_2$ and CO in the EGR flow 108 impact the stability and knock tolerance of the engine 102. The amounts of these components are primarily a function of the quality of the fuel being burned and the AFR of the primary EGR cylinder(s) b. A fuel with a higher H:C ratio will generate more $H_2$ at the same AFR or lambda level as a fuel with a lower H:C ratio. The richer the primary EGR cylinder(s) b are run also creates more $H_2$ and CO up to the point of reaching the rich flammability limit in these cylinders.

Figure 7:
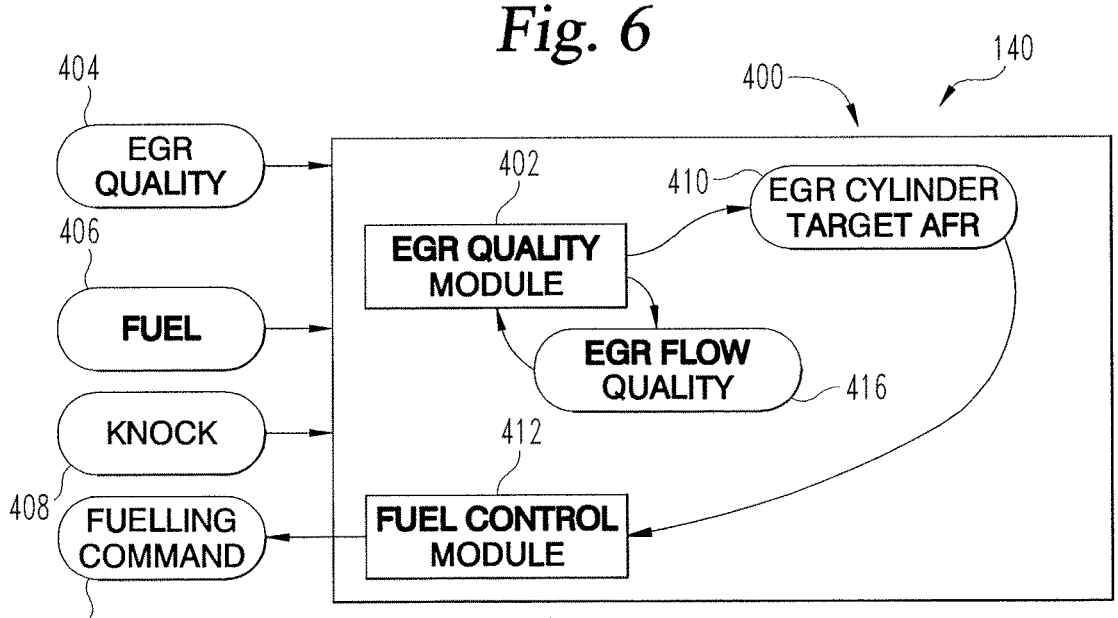
FIG. 7 is a schematic depiction of one embodiment of a control apparatus of the system of FIG. 6.

The system of FIG. 6 includes an embodiment of controller 140 illustrated as controller apparatus 400 in FIG. 7. Controller apparatus 400 includes an EGR quality module 402 that receives, for example, an EGR quality input 404, a fuel input 406, and/or a knock input 408. In one embodiment, EGR quality module 402 is structured to interpret an EGR cylinder target AFR 410 and an EGR flow quality 416 in response to one or more of the EGR quality input 404, fuel input 406, and/or knock input 408. In a further embodiment, EGR quality module 402 is structured to adjust one or more combustion inputs such as the EGR cylinder target AFR 410 in response to an EGR flow quality deviation condition. A fuel control module 412 is structured to output a fuelling command 412 in response to the EGR cylinder target AFR 410.

In one embodiment, the EGR flow quality 416 includes an amount of $H_2$ and CO in the EGR flow 108 in EGR passage 109 determined in response to one or more of the EGR quality input 404, fuel quality input 406, and/or the knock level input 408 in the primary EGR cylinder(s) b. An EGR flow quality deviation condition occurs in response to the EGR flow quality 416 deviating from an expected EGR flow quality by more than a threshold amount, or by exceeding or being less than certain EGR flow quality limits or thresholds. For example, if the amount of $H_2$ in the EGR flow 108 is high enough such that the mixture of the EGR flow 108 and fresh air flow 118 exceeds the $H_2$ lean flammability limit, there is a possibility for an intake manifold over-pressure event. Therefore, EGR quality module 402 interprets the EGR flow quality 416 to determine if an EGR flow quality deviation condition exists, and adjusts a combustion input such as the EGR cylinder target AFR 410 to mitigate the risk of an intake manifold over-pressure event.

Several methods for determining EGR flow quality 416 are contemplated. In one example, an EGR quality virtual sensor could be calibrated to provide EGR quality input 404 for a specific fuel type and an AFR for the primary EGR cylinder(s) b. This virtual sensor would be accurate as long as the fuel that is used during operation corresponds to the fuel used to calibrate the system. To improve this EGR quality virtual sensor, a fuel quality sensor 180 could be used at fuel source 182 to provide fuel input 406 by, for example, measuring the H:C ratio of the fuel going into the primary EGR cylinder(s) b. In another embodiment, an EGR quality sensor 186 which measures $H_2$ and or CO directly in EGR flow 108 can be used in place of or in combination with a virtual EGR quality sensor.

Fuel quality sensor 180 can be used as an input in addition to or alternatively to the input from the EGR quality sensor 186 and/or the virtual EGR quality sensor. The fuel quality sensor 180, in one embodiment, could be a known sensor used to determine the amount of ethanol in a gasoline mixture, such as found on flex fuel vehicle, or any other type of fuel quality sensor. The fuel input 406 from the fuel quality sensor 180 is used to determine a fuel quality deviation condition and adjust the combustion inputs such as the EGR cylinder target AFR 410 of dedicated EGR cylinder(s) b to achieve a desired EGR quality with the current fuel quality. For fuels with a lower H:C ratio than the calibration fuel, adjusting the primary EGR cylinder target AFR can include decreasing the target AFR or lambda for the primary EGR cylinder(s) b. This adjustment and resultant fuelling command 414 decreases knock and increases stability at low load. For fuels with a higher H:C ratio than the calibration fuel, adjusting the EGR cylinder target AFR 410 can include increasing the target AFR or lambda for the primary EGR cylinder(s) b. This adjustment in the target AFR and the resulting fuelling command 414 lowers the amount of $H_2$ in the EGR flow 108 and reduces the risk for an intake manifold over-pressure event.

Another input, alternatively or in addition to the EGR quality virtual sensor and/or the fuel quality sensor, includes an engine knock sensor 188. The engine 102 is tuned or calibrated so a certain amount of knock activity is expected and measured by the knock sensor 188 under normal operation. If a higher than expected amount of knock activity is measured, the fuel being used can be assumed to be generating a lower than expected EGR flow quality 416 and control apparatus 400 issues a control command to improve the EGR flow quality 416. In one embodiment, when knock level activity has increased above a threshold amount, the EGR cylinder target AFR 410 (or lambda) is reduced to improve EGR flow quality 416 and provide reduced knock levels in response to providing a fuelling amount with fuelling command 414 corresponding to the adjusted EGR cylinder target AFR 410.

In certain embodiments, control apparatus 400 is structured to detect and/or interpret one or more parameters related to the operation of the engine 102, to determine a knock index value in response to the one or more detected parameters, and to compare the knock index value with a knock threshold value. The knock index value is an incremental indicator of the risk of knock during a combustion event, and may be correlated with a modeled or measured knock probability, a knock measurement device, a sound threshold, an in-cylinder measurement installed in a test engine, and/or any other indicator of knock understood in the art. The knock threshold value is a selected threshold for the indicator of the risk of knock according to the selected indication method. The selection of units for the knock index value, or the selection of a magnitude scale for a dimensionless knock index value, are mechanical steps for one of skill in the art having the benefit of the disclosure herein. In certain embodiments, a quantitative or qualitative knock description is developed for a test engine, the values of the knock index value are calibrated to the selected parameters related to the engine, and the knock threshold value is set according to the desired knock threshold value and/or the desired knock threshold value with a margin applied.

In certain embodiments, the knock threshold value changes over time, with engine operating conditions, according to operator inputs, or according to other selected criteria. Example and non-limiting operations to adjust the knock threshold value include raising or lowering the knock threshold value as the engine ages, increasing the knock threshold value as the engine load increases, and/or increasing the knock threshold value in response to an operator request for greater response or power output.

In one specific embodiment in which an ethanol containing fuel is used, control apparatus 400 is structured to receive fuel inputs 406 of fuel quality from fuel quality sensor 180 and issue a fuelling command 414 to primary EGR cylinder(s) b in response to a target AFR 410 or lambda of primary EGR cylinder(s) b that decreases as ethanol content of the fuel decreases and increases ethanol content increases. However, it should be understood that the systems and methods disclosed herein have application to any engine with one or more primary EGR cylinder(s) b that burn any fuel, including those where the H:C ratio of the fuel has the potential to change in operation.

In another embodiment, the engine 102 is configured to burn alternative fuels and the fraction of the alternative fuel that is burned can vary over time. At high load conditions, the EGR fraction provided by primary EGR cylinder(s) b can vary as a function of the amount of the alternative fuel that is provided in order to, for example, control knock conditions. However, when engine 102 operates below a threshold torque limit where knock conditions are not of particular concern, the EGR fraction remains fixed in order to reduce pumping work by engine 102 and improve fuel economy. The threshold torque limit can vary as a function of the quality of the alternative fuel that is used.

Various aspects of the systems, methods and apparatus are disclosed herein. For example, according to one aspect, a system includes an engine having a plurality of cylinders. At least one of the plurality of cylinders is a primary EGR cylinder connected to provide an EGR flow to an intake of the internal combustion engine and the other cylinders are non-primary EGR cylinders connected to provide an exhaust flow to an exhaust system. The system includes at least one sensor for detecting an EGR quality condition associated with the at least one primary EGR cylinder and a controller structured to change combustion inputs to the plurality of cylinders in response to the EGR quality condition in the least one primary EGR cylinder.

According to one embodiment, the at least one sensor includes an ion sensor in a combustion chamber of the at least one primary EGR cylinder that is operable to detect the EGR quality condition. The EGR quality condition includes at least one of unburned hydrocarbons, $H_2$, and an air-fuel ratio in the EGR flow from the at least one primary EGR cylinder. According to another embodiment, the at least one sensor includes an optical sensor operable to detect the EGR quality condition, and the EGR quality condition includes a $CO_2$ amount in the EGR flow from the at least one primary EGR cylinder. In yet another embodiment, the at least one sensor includes an oxygen sensor operationally coupled to an exhaust passage receiving EGR flow from the at least one primary EGR cylinder.

According to another embodiment, the EGR quality condition includes an incomplete combustion event in the at least one primary EGR cylinder. The incomplete combustion event includes at least one of a misfire condition, a knock condition, and a cylinder overpressure condition in the at least one primary EGR cylinder. In another embodiment, the combustion inputs include at least one of an ignition timing and a fuelling amount of the non-primary EGR cylinders, and the controller is structured to at least one of adjust the ignition timing and lean the fuelling amount of the non-primary EGR cylinders in response to the EGR quality condition. In another embodiment, the at least one sensor is arranged to detect the EGR quality condition of only the primary EGR cylinder.

According to yet another embodiment, the controller is structured to interpret a hydrogen amount in the EGR flow in response to a signal from the at least one sensor indicating the EGR quality condition and the controller is further structured to change the combustion inputs by fuelling the non-primary EGR cylinders with a fuelling amount that offsets the hydrogen amount. In another embodiment, the controller is structured to interpret at least one of a fuel composition value and a fuel quality value associated with a fuel provided to the at least one primary EGR cylinder in response to a signal from the at least one sensor indicating the EGR quality condition.

In another aspect, a system includes an internal combustion engine having at least one primary EGR cylinder connected to provide an EGR flow to an intake of the internal combustion engine and a plurality of non-primary EGR cylinders connected to provide an exhaust flow to an exhaust system. The system includes an EGR quality sensor operable to provide an output corresponding to a quality of the EGR flow from the at least one primary EGR cylinder and a controller structured to interpret an EGR flow quality deviation condition in response to the quality of the EGR flow. The controller is further structured to change combustion inputs to the at least one primary EGR cylinder in response to the EGR flow quality deviation condition.

In one embodiment, the system includes a fuel quality sensor operable to provide an output corresponding to a quality of a fuel provided to the at least one primary EGR cylinder and the plurality of non-primary EGR cylinders. The controller is structured to interpret a fuel quality deviation condition in response to the quality of the fuel, and in response to the fuel quality deviation condition, to change combustion inputs to the at least one primary EGR cylinder. In a refinement of this embodiment, the controller is structured to change the combustion inputs by adjusting a target air-fuel ratio of the EGR flow and to control a fuelling amount to the at least one primary EGR cylinder in response to the target air-fuel ratio to produce a desired amount of one of $H_2$, unburned HC, and CO in the EGR flow. In another refinement of this embodiment, the system includes a knock sensor operable to provide an indication of a knock activity associated with operation of the internal combustion engine, and the controller is structured to change the combustion inputs to the at least one primary EGR cylinder in response to the knock activity exceeding a threshold amount.

According to another aspect, a method includes: interpreting a misfire condition produced by a primary EGR cylinder of an internal combustion engine connected to provide an EGR flow to an intake of the engine; determining a fuel amount for a plurality of non-primary EGR cylinders of the internal combustion engine in response to the misfire condition, the plurality of non-primary EGR cylinders connected to provide an exhaust flow to an exhaust system; and fueling the non-primary EGR cylinders in response to the determined fuel amount.

In one embodiment of the method, interpreting the misfire condition includes determining at least one of an air-fuel ratio and an $H_2$ amount in the EGR flow from the at least one primary EGR cylinder and determining the fuelling amount includes determining the fuelling amount in response to the at least one of the air-fuel ratio and the $H_2$ amount. In another embodiment, interpreting the misfire condition includes interpreting a misfire condition produced by the plurality of non-primary EGR cylinders in response to an exhaust manifold pressure associated with the plurality of non-primary EGR cylinders.

In another aspect, a method includes: interpreting an EGR flow quality of an EGR flow from a primary EGR cylinder connected to an intake of an internal combustion engine, the internal combustion engine including a plurality of non-primary EGR cylinders connected to an exhaust system; determining an EGR flow quality deviation condition in the EGR flow; determining a fuel amount for the primary EGR cylinder in response to the EGR flow quality deviation condition; and fueling the primary EGR cylinder in response to the determined fuel amount.

In one embodiment, interpreting the EGR flow quality includes at least one of: interpreting at least one of a hydrogen amount and CO amount in the EGR flow from the primary EGR cylinder; interpreting a fuel quality value for a fuel provided to the primary EGR cylinder; and interpreting a knock condition of the primary EGR cylinder. In a refinement of this embodiment, determining the EGR flow quality deviation condition includes at least one of: determining a hydrogen amount in the EGR flow exceeds a limit; determining the fuel quality deviates from an expected fuel quality; and determining the knock condition exceeds a knock activity threshold.

According to another aspect, a method includes interpreting a torque request to an internal combustion engine, the internal combustion including at least one primary EGR cylinder that is dedicated to providing EGR flow during at least some operating conditions, the internal combustion engine further including a plurality of non-primary EGR cylinders connected to an exhaust system; determining a deviation of an actual torque output of the internal combustion from the torque request; and advancing a spark timing only in the at least one primary EGR cylinder in response to the deviation.

According to another aspect, a system includes an engine having a plurality of cylinders. The plurality of cylinders include at least one primary EGR cylinder connected to provide an EGR flow to an intake of the internal combustion engine and the other cylinders are non-primary EGR cylinders connected to provide an exhaust flow to an exhaust system. The system includes a controller structured to interpret an air-fuel ratio deviation condition in response to a difference between an air-fuel ratio in the EGR flow and a target air-fuel ratio. The controller is further structured to provide, in response to the air-fuel ratio deviation condition, a first fuelling amount to the at least one primary EGR cylinder and a second fuelling amount to the non-primary EGR cylinders that differs from the first fuelling amount.

In one embodiment, the system includes a sensor connected to the controller that is structured to provide a signal representative of an oxygen amount in the EGR flow to the controller. In a refinement of this embodiment, sensor is an oxygen sensor connected to an EGR passage providing the EGR flow from the primary EGR cylinder to the intake.

In another embodiment, controller is structured to interpret a fresh air mass flow from a difference between a charge air mass flow determined from engine operating parameters and an EGR mass flow determined from a ratio of a number of primary EGR cylinders to the plurality of cylinders. A target fuelling amount to each of the plurality of cylinders is based on the fresh air mass flow and the first fuelling amount and the second fuelling amount are modifications of the target fuelling amount.

According to another aspect, a method includes: operating an internal combustion engine having a plurality of cylinders, the plurality of cylinders including at least one primary EGR cylinder and the other cylinders including non-primary EGR cylinders; measuring an oxygen amount in an exhaust gas produced by the non-primary EGR cylinders, the exhaust gas being provided to an exhaust system; estimating an excess or deficit oxygen amount in an EGR flow from the at least one primary EGR cylinder, the EGR flow being provided to an intake of the internal combustion engine; and determining a fuelling amount to the plurality of cylinders in response to the oxygen amount measured in the exhaust gas and the estimated excess or deficit oxygen amount in the EGR flow.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
an engine having a plurality of cylinders, the plurality of cylinders comprising at least one primary exhaust gas recirculation (EGR) cylinder connected to provide an EGR flow to an intake of the internal combustion engine and the other cylinders comprising non-primary EGR cylinders connected to provide an exhaust flow to an exhaust system;
at least one of an ion sensor and an optical sensor for detecting an EGR quality condition associated with the at least one primary EGR cylinder, the EGR quality condition that is detected by the at least one sensor including at least one of unburned hydrocarbons in the EGR flow, $H_2$ in the EGR flow, and a $CO_2$ amount in the EGR flow; and
a controller structured to change combustion inputs to the plurality of cylinders in response to the EGR quality condition in the least one primary EGR cylinder.

2. The system of claim 1, wherein the at least one sensor includes the ion sensor in a combustion chamber of the at least one primary EGR cylinder that is operable to detect the EGR quality condition.

3. The system of claim 1, wherein the at least one sensor includes the optical sensor operable to detect the EGR quality condition.

4. The system of claim 1, wherein the EGR quality condition includes an incomplete combustion event in the at least one primary EGR cylinder, the incomplete combustion event including at least one of a misfire condition, a knock condition, and a cylinder overpressure condition in the at least one primary EGR cylinder.

5. The system of claim 1, wherein the combustion inputs include at least one of an ignition timing and a fuelling amount of the non-primary EGR cylinders, and the controller is structured to at least one of adjust the ignition timing and lean the fuelling amount of the non-primary EGR cylinders in response to the EGR quality condition.

6. The system of claim 1, wherein the at least one sensor is arranged to detect the EGR quality condition of only the primary EGR cylinder.

7. The system of claim 1, wherein the controller is structured to interpret a hydrogen amount in the EGR flow in response to a signal from the at least one sensor indicating the EGR quality condition and the controller is further structured to change the combustion inputs by fuelling the non-primary EGR cylinders with a fuelling amount that offsets the hydrogen amount.

8. The system of claim 7, wherein the controller is structured to interpret at least one of a fuel composition value and a fuel quality value associated with a fuel provided to the at least one primary EGR cylinder in response to a signal from the at least one sensor indicating the EGR quality condition.

9. A system comprising:
an internal combustion engine having at least one primary exhaust gas recirculation (EGR) cylinder connected to provide an EGR flow to an intake of the internal combustion engine and a plurality of non-primary EGR cylinders connected to provide an exhaust flow to an exhaust system;
an EGR quality sensor operable to provide an output corresponding to a quality of the EGR flow from the at least one primary EGR cylinder;
a knock sensor operable to provide an indication of a knock activity of the at least one primary EGR cylinder associated with operation of the internal combustion engine; and
a controller structured to interpret an EGR flow quality deviation condition in response to the quality of the EGR flow, and in response to the EGR flow quality deviation condition, to change combustion inputs to the at least one primary EGR cylinder and the plurality of non-primary EGR cylinders, and wherein the controller is further structured to change the combustion inputs to the at least one primary EGR cylinder in response to the knock activity exceeding a threshold amount.

10. The system of claim 9, further comprising a fuel quality sensor operable to provide an output corresponding to a quality of a fuel provided to the at least one primary EGR cylinder and the plurality of non-primary EGR cylinders, wherein the controller is structured to interpret a fuel quality deviation condition in response to the quality of the fuel, and in response to the fuel quality deviation condition, to change combustion inputs to the at least one primary EGR cylinder.

11. The system of claim 10, wherein the controller is structured to change the combustion inputs by adjusting a target air-fuel ratio of the EGR flow and to control a fuelling amount to the at least one primary EGR cylinder in response to the target air-fuel ratio to produce a desired amount of one of $H_2$, unburned HC, and CO in the EGR flow.

12. A method, comprising:
interpreting a misfire condition produced by a primary exhaust gas recirculation (EGR) cylinder of an internal combustion engine connected to provide an EGR flow to an intake of the engine, wherein interpreting the misfire condition includes determining an $H_2$ amount in the EGR flow from the at least one primary EGR cylinder;
determining a fuel amount for a plurality of non-primary EGR cylinders of the internal combustion engine in response to the misfire condition and the $H_2$ amount, the plurality of non-primary EGR cylinders connected to provide an exhaust flow to an exhaust system; and
fueling the non-primary EGR cylinders in response to the determined fuel amount.

13. The method of claim 12, wherein interpreting the misfire condition includes interpreting a misfire condition produced by the plurality of non-primary EGR cylinders in response to an exhaust manifold pressure associated with the plurality of non-primary EGR cylinders.

14. A method, comprising:
interpreting an exhaust gas recirculation (EGR) flow quality of an EGR flow from a primary EGR cylinder connected to an intake of an internal combustion engine, the internal combustion engine including a plurality of non-primary EGR cylinders connected to an exhaust system, wherein interpreting the EGR flow quality includes determining a fuel quality value for a fuel provided to the primary EGR cylinder and determining a knock condition of the primary EGR cylinder;
determining an EGR flow quality deviation condition in the EGR flow based on the EGR flow quality;
determining a fuel amount for the primary EGR cylinder and the non-primary EGR cylinders in response to the EGR flow quality deviation condition; and
fueling the primary EGR cylinder and the non-primary EGR cylinders in response to the determined fuel amount.

15. The method of claim 14, wherein determining the EGR flow quality deviation condition further includes at least one of:
determining a hydrogen amount in the EGR flow exceeds a limit;
determining the fuel quality deviates from an expected fuel quality; and
determining the knock condition exceeds a knock activity threshold.

16. A method, comprising:
interpreting a torque request to an internal combustion engine, the internal combustion including at least one primary exhaust gas recirculation (EGR) cylinder that is dedicated to providing EGR flow during at least some operating conditions, the internal combustion engine further including a plurality of non-primary EGR cylinders connected to an exhaust system;
determining a deviation of an actual torque output of the internal combustion from the torque request; and
advancing a spark timing only in the at least one primary EGR cylinder in response to the deviation.

17. A system comprising:
an engine having a plurality of cylinders, the plurality of cylinders comprising at least one primary exhaust gas recirculation (EGR) cylinder connected to provide an EGR flow to an intake of the internal combustion engine and the other cylinders comprising non-primary EGR cylinders connected to provide an exhaust flow to an exhaust system; and
a controller structured to interpret an air-fuel ratio deviation condition in response to a difference between an air-fuel ratio in the EGR flow and a target air-fuel ratio, the controller further being structured to provide, in response to the air-fuel ratio deviation condition, a first fuelling amount to the at least one primary EGR cylinder and a second fuelling amount to the non-primary EGR cylinders that differs from the first fuelling amount, wherein the controller is structured to determine a fresh air mass flow from a difference between a charge air mass flow determined from engine operating parameters and an EGR mass flow determined from a ratio of a number of primary EGR cylinders to the plurality of cylinders, wherein a target fuelling amount to each of the plurality of cylinders is based on the fresh air mass flow and the first fuelling amount and the second fuelling amount are modifications of the target fuelling amount.

18. The system of claim 17, further comprising a sensor connected to the controller, the sensor being structured to provide a signal representative of an oxygen amount in the EGR flow to the controller.

19. The system of claim 18, wherein the sensor is an oxygen sensor connected to an EGR passage providing the EGR flow from the primary EGR cylinder to the intake.

\* \* \* \* \*